United States Patent [19]

Takasaki

[11] Patent Number: 4,816,678
[45] Date of Patent: Mar. 28, 1989

[54] METHOD OF DETECTING STORED RADIATION ENERGY LEVEL ON STIMULABLE PHOSPHOR SHEET

[75] Inventor: Yoshimi Takasaki, Kanagawa, Japan
[73] Assignee: Fuji Photo Film Co., Ltd., Kanagawa, Japan
[21] Appl. No.: 169,702
[22] Filed: Mar. 18, 1988
[30] Foreign Application Priority Data Mar. 20, 1987 [JP] Japan ................... 62-67307

[51] Int. Cl.⁴ ............................... G05B 1/02
[52] U.S. Cl. ............................ 250/327.2; 250/484.1
[58] Field of Search ................ 250/327.2 D, 327.2 F, 250/327.2 H, 484.1 B

[56] References Cited

U.S. PATENT DOCUMENTS 4,258,264  3/1981  Kotera et al. ............... 250/484.1
4,400,619  8/1983  Kotera et al. ............... 250/327.2
4,590,369  5/1986  Horikawa ................... 250/252.1
4,687,937  8/1987  Aagano et al. .............. 250/484.1

FOREIGN PATENT DOCUMENTS 56-11395   2/1981  Japan ..................... 250/327.2
56-12599   2/1981  Japan .
60-260035 12/1985  Japan .
62-16666   1/1987  Japan .

Primary Examiner—Janice A. Howell
Assistant Examiner—Constantine Hannaher
Attorney, Agent, or Firm—Sughrue, Mion, Zinn, Macpeak & Seas

[57] ABSTRACT

A method of detecting stored radiation energy level on a stimulable phosphor sheet comprises the steps of storing a predetermined level of radiation energy on a stimulable phosphor sheet for test before image read-out is carried out by scanning a stimulable phosphor sheet carrying a radiation image stored thereon with stimulating rays which cause the stimulable phosphor sheet to emit light and detecting the emitted light by a photomultiplier, carrying out the scanning and light detection for the stimulable phosphor sheet for test, and detecting a voltage Vo generated at a bleeder resistor of the photomultiplier at each scanning position. In the course of carrying out image read-out from the stimulable phosphor sheet carrying the radiation image stored thereon, a voltage V generated at the bleeder resistor is detected at each scanning position, and the voltage V is compared with the voltage Vo. Based on the value V-Vo, a radiation energy level exceeding the predetermined level is detected.

4 Claims, 3 Drawing Sheets

F I G. 2
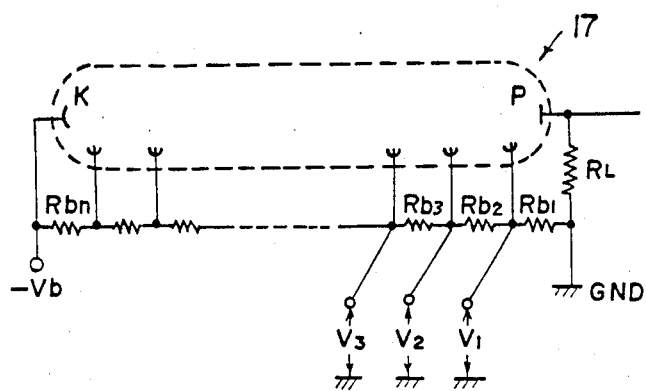
F I G. 3
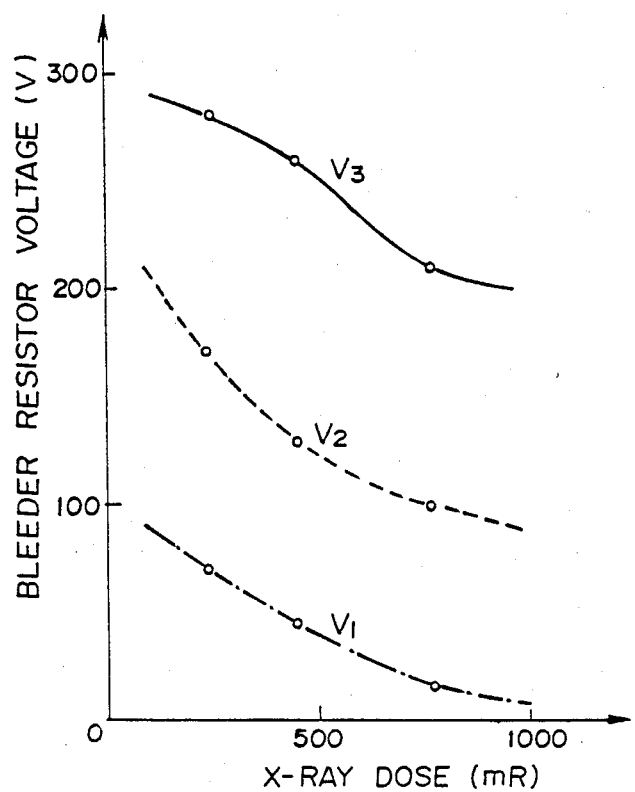

METHOD OF DETECTING STORED RADIATION ENERGY LEVEL ON STIMULABLE PHOSPHOR SHEET

BACKGROUND OF THE INVENTION

1. Field of the Invention

This invention relates to a method of detecting radiation energy stored in an amount exceeding a predetermined amount on a stimulable phosphor sheet in the course of reading out a radiation image stored on the stimulable phosphor sheet by scanning the stimulable phosphor sheet with stimulating rays which cause it to emit light in proportion to the stored radiation energy, and photoelectrically detecting the emitted light.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays which cause the stimulable phosphor sheet to emit light in proportion to the stored radiation energy. The light emitted by the stimulable phosphor sheet upon stimulation thereof is photoelectrically detected and converted to an electric image signal by a photodetector, and the radiation image of the object is reproduced as a visible image by use of the image signal on a recording medium such as a photographic film, a display device such as a cathode ray tube (CRT), or the like.

As disclosed in, for example, U.S. Pat. No. 4,400,619 and Japanese Unexamined Patent Publication No. 56(1981)-12599, the stimulable phosphor sheet can be used repeatedly by releasing therefrom the radiation energy remaining after the radiation image read-out by exposure to light or heat.

However, in the case where the level of the residual radiation energy is very high, the radiation energy often remains on the stimulable phosphor sheet even though the stimulable phosphor sheet is exposed to erasing light for releasing the residual radiation energy therefrom. Accordingly, based on the finding that the level of the residual radiation energy is proportional to the level of the radiation energy stored on the stimulable phosphor sheet in the image recording step, it has been proposed in, for example, Japanese Unexamined Patent Publication No. 58(1983)-80633 to control the erasing light irradiation amount on the basis of the amount of light emitted by the stimulable phosphor sheet in the image read-out step (the amount of the emitted light is proportional to the level of the radiation energy stored on the stimulable phosphor sheet).

On the other hand, as the apparatus for reading out the radiation image, an apparatus for scanning the stimulable phosphor sheet with stimulating rays and detecting the light emitted by the stimulable phosphor sheet in proportion to the stored radiation energy by use of a photomultiplier has heretofore been used widely. However, in the case where the photomultiplier is used as the photodetector for detecting the light emitted by the stimulable phosphor sheet, the read-out gain of the photomultiplier is adjusted as suitable for the read-out of a normal radiation image. Therefore, in the case where the radiation energy was stored on a very high level on the stimulable phosphor sheet, it often occurs that the output current of the photomultiplier saturates. In this case, it is not always possible to accurately control the erasing light irradiation amount by ascertaining the level of the residual radiation energy from the level of the radiation energy which was stored on the stimulable phosphor sheet in the image recording step.

In view of the above circumstances, the applicant proposed in Japanese Unexamined Patent Publication No. 60(1985)-260035 a method capable of accurately detecting the level of the radiation energy stored on a stimulable phosphor sheet, and consequently the level of the residual radiation energy, and accurately controlling the erasing light irradiation amount even in such a case that the output current of the photomultiplier saturates. The proposed method comprises the steps of detecting the level of the radiation energy stored on the stimulable phosphor sheet from the voltage generated at a bleeder resistor of the photomultiplier, and controlling the erasing light irradiation amount in accordance with the voltage generated at the bleeder resistor. The proposed method is based on the finding that, even after the output current of the photomultiplier saturates or approaches the saturated condition, the voltage generated at the bleeder resistor decreases with sufficient sensitivity as the amount of light received by the photomultiplier increases.

With the proposed method, basically, the erasing light irradiation amount can be controlled accurately. However, in the case where the light guiding optical system for guiding the light emitted by the stimulable phosphor sheet to the photomultiplier or the photomultiplier itself exhibits shading (i.e. the problem that a portion where the light guiding efficiency or the light receiving efficiency is low is present locally), the amount of the light by the stimulable phosphor sheet and guided or received through said portion is detected as a light amount lower than the actual light amount. Therefore, the level of the radiation energy stored on the stimulable phosphor sheet is detected incorrectly.

SUMMARY OF THE INVENTION

The primary object of the present invention is to provide a method of accurately detecting a level of stored radiation energy on a stimulable phosphor sheet, particularly such a very high level of the stored radiation energy that the output current of a photomultiplier saturates, by considering the adverse effects of shading.

Another object of the present invention is to provide a method of detecting a level of stored radiation energy on a stimulable phosphor sheet, which enables accurate control of the amount of erasing light irradiated onto the stimulable phosphor sheet.

The present invention provides a method of detecting a level of stored radiation energy on a stimulable phosphor sheet in radiation image read-out wherein a stimulable phosphor sheet carrying a radiation image stored thereon is scanned by stimulating rays which cause the stimulable phosphor sheet to emit light in proportion to the stored radiation energy, and photoelectrically detecting the light emitted by scanned portion of the stimulable phosphor sheet by use of a photomultiplier, thereby to obtain image signals representing the radiation image, the method of detecting a level of stored radiation energy on a stimulable phosphor sheet comprising the steps of:

(i) storing a predetermined level of radiation energy on a stimulable phosphor sheet for test prior to said radiation image read-out, (ii) carrying out the scanning by said stimulating rays and the detection of said emitted light for said stimulable phosphor sheet for test, detecting a voltage Vo generated at a bleeder resistor of said photomultiplier at each scanning position of said stimulating rays at this time, and storing said voltage Vo to correspond to said scanning position in a storage means, (iii) in the course of carrying out said radiation image read-out from said stimulable phosphor sheet carrying said radiation image stored thereon, detecting a voltage V generated at said bleeder resistor of said photomultiplier at each scanning position of said stimulating rays, (iv) comparing said detected voltage V with said voltage Vo stored in said storage means at each scanning position, and (v) based on the value of V−Vo, detecting a radiation energy level, that exceeds said predetermined level, on said stimulable phosphor sheet subjected to said radiation image read-out.

As mentioned above, the level of the stored radiation energy on the stimulable phosphor sheet can be detected by measuring the voltage V generated at the bleeder resistor in the course of reading out the radiation image from the stimulable phosphor sheet. Also, in the case where the light guiding optical system or the photomultiplier exhibits shading as mentioned above, the voltage V is caused to fluctuate by shading. However, the voltage Vo generated at the bleeder resistor in the course of read-out processing of the stimulable phosphor sheet for test storing the predetermined level of the radiation energy also fluctuates in accordance with the shading condition in the same manner as the voltage V. Therefore, when the voltage difference (V−Vo) is calculated, the value calculated accurately represents the level of the stored radiation energy exceeding the aforesaid predetermined level.

In the case where the level of the stored radiation energy exceeding the predetermined level is detected in the manner as mentioned above, the erasing light irradiation amount can be controlled continuously or stepwise in accordance with the detected level. In the case where the control means for this purpose is not provided, the stimulable phosphor sheet may be exposed a plurality of times to the erasing light or may be omitted from reuse as a sheet which is to be erased further when any radiation energy level above the predetermined level is detected (i.e. when V−Vo<0).

With the method of detecting a level of stored radiation energy on a stimulable phosphor sheet in accordance with the present invention, the stored radiation energy of a very high level that could not be accurately detected based on the output current of the photomultiplier can be detected accurately even though the photomultiplier or the light guiding optical system exhibits shading. Therefore, with the method of detecting a level of stored radiation energy on a stimulable phosphor sheet in accordance with the present invention, the amount of the erasing light irradiated onto the stimulable phosphor sheet can be controlled accurately, or the stimulable phosphor sheet which is to be erased further can be prevented from being sent to the reuse step. Accordingly, reliability of the radiation image recording and reproducing system can be improved.

BRIEF DESCRIPTION OF THE DRAWINGS

FIG. 2 is an electric circuit diagram of the photomultiplier used in the method of the present invention, FIG. 3 is a graph showing an example of the relationship between the amount of X-rays irradiated onto the stimulable phosphor sheet and the voltage generated at the bleeder resistor of the photomultiplier.

DESCRIPTION OF THE PREFERRED EMBODIMENTS

The present invention will hereinbelow be described in further detail with reference to the accompanying drawings.

Figure 1:
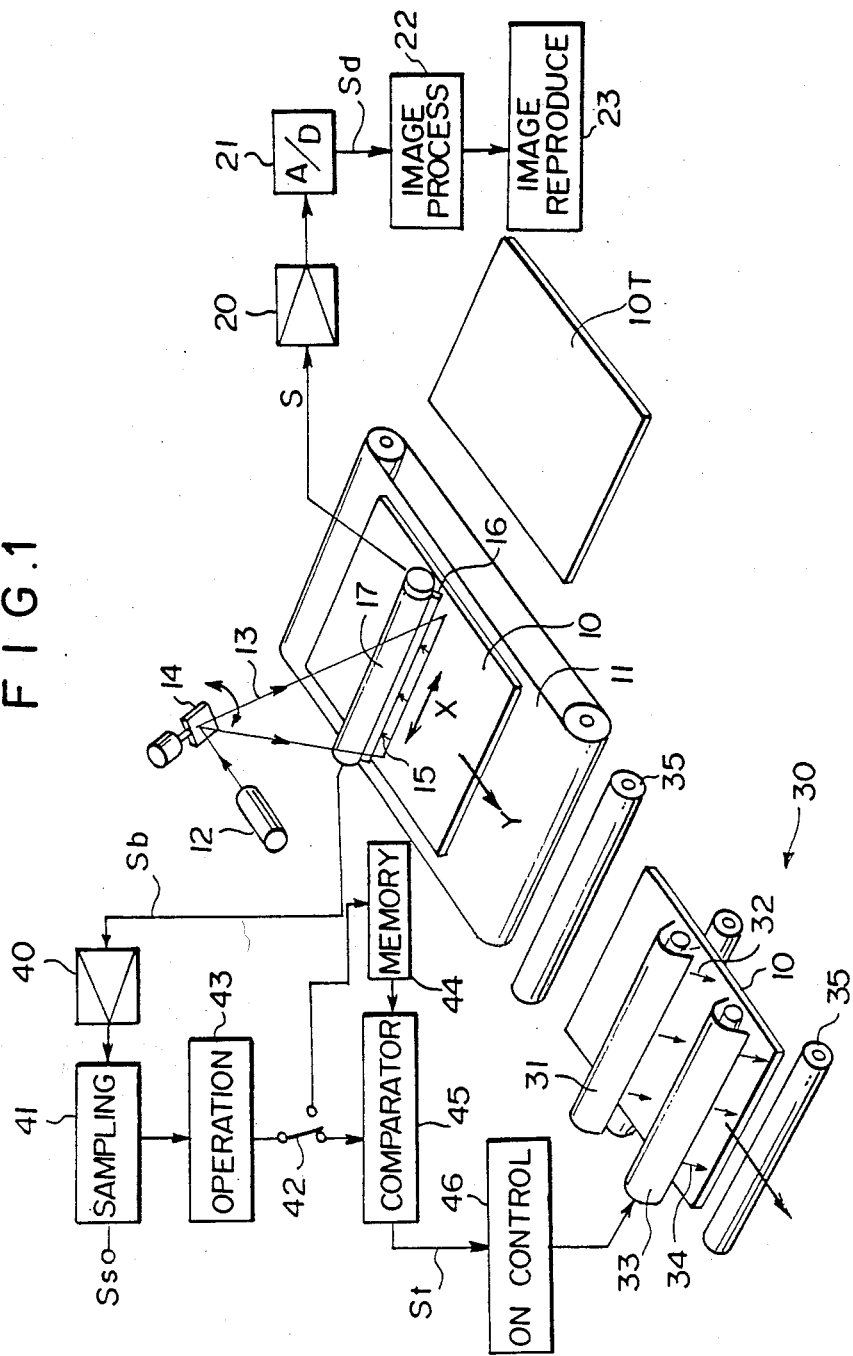
FIG. 1 is a schematic view showing a radiation image read-out apparatus wherein the method of detecting a level of stored radiation energy on a stimulable phosphor sheet in accordance with the present invention is employed.

With reference to FIG. 1, a stimulable phosphor sheet 10 carrying a radiation image stored thereon is conveyed by a sheet conveyance means 11 comprising an endless belt or the like in a sub-scanning direction as indicated by the arrow Y. A laser beam 13 emitted as stimulating rays by a laser beam source 12 is deflected by a light deflector 14 constituted by a galvanometer mirror or the like, and scans the stimulable phosphor sheet 10 in a main scanning direction as indicated by the arrow X approximately normal to the sub-scanning direction as indicated by the arrow Y. When the stimulable phosphor sheet 10 is exposed to the laser beam 13, the exposed portion of the sheet 10 emits light 15 in an amount proportional to the stored radiation energy. The emitted light 15 is guided by a light guide member 16 and is photoelectrically detected by a photomultiplier 17 acting as a photodetector.

The photomultiplier 17 employed in this embodiment is a long photomultiplier as disclosed in, for example, Japanese Unexamined Patent Publication No. 62(1987)-16666, and is provided with a light receiving face having a length equal to or nearly equal to the overall width of the stimulable phosphor sheet 10.

Output signals S of the photomultiplier 17 are amplified by a logarithmic amplifier 20, and then digitized by an A/D converter 21 into digital read-out image signals Sd. The digital read-out image signals Sd obtained in this manner are sent to an image processing circuit 22 which carries out image processing (signal processing) such as gradation processing and frequency response processing. The processed read-out image signals Sd are then sent to an image reproducing apparatus 23 constituted by a CRT, a light beam scanning recording apparatus or the like. The read-out image signals Sd represent the amount of the light 15 emitted by the stimulable phosphor sheet 10 in proportion to the stored radiation energy, i.e. the radiation image which was stored on the stimulable phosphor sheet 10, and therefore the radiation image can be reproduced as a visible image by use of the read-out image signals Sd in the image reproducing apparatus 23.

The stimulable phosphor sheet 10 subjected to radiation image read-out processing in the manner as mentioned above is then sent to an erasing section 30 by a conveyance means 35 constituted by rollers or the like, and is moved at a predetermined speed at the erasing section 30. At the erasing section 30, the stimulable phosphor sheet 10 is exposed to erasing light 32 produced by a first erasing light source 31 constituted by a tungsten-filament lamp, a halogen lamp or the like. The erasing light 32 has a wavelength within the stimulation wavelength range for the stimulable phosphor of the stimulable phosphor sheet 10. Upon exposure to the erasing light 32, radiation energy remaining on the stimulable phosphor sheet 10 after the radiation image read-out has been carried out is released. In this manner, the stimulable phosphor sheet 10 becomes reusable for radiation image recording. At this time, the amount Q of the erasing light 32 irradiated onto the stimulable phosphor sheet 10 is equal to erasing light illuminance×irradiation time.

Detection of the level of the stored radiation energy on the stimulable phosphor sheet 10 by the method of the present invention and control of the erasing light irradiation amount in accordance with the detected level will be described hereinbelow. Before the radiation image read-out is carried out for the stimulable phosphor sheet 10 in the manner as mentioned above, a stimulable phosphor sheet 10T for test carrying a predetermined level of radiation energy stored thereon by uniform exposure to radiation of a predetermined dose is prepared. The predetermined level is such a critical value that the residual radiation energy after the radiation image read-out processing is carried out cannot be released substantially with the aforesaid erasing light irradiation amount Q when the radiation energy of a level higher than the predetermined level was stored on the stimulable phosphor sheet 10. Stated differently, in the case where the radiation energy of a level not higher than the predetermined level was stored on the stimulable phosphor sheet 10, the residual radiation energy on the stimulable phosphor sheet 10 can be released substantially by use of the aforesaid erasing light irradiation amount Q and can be made reusable for radiation image recording.

The stimulable phosphor sheet 10T for test is conveyed by the sheet conveyance means 11 in the same manner as the case of the radiation image read-out, and the laser beam 13 is scanned on the stimulable phosphor sheet 10T for test. At this time, voltage signals Sb representing the voltages generated at a predetermined bleeder resistor of the photomultiplier 17 are detected, sent to and amplified by an amplifier 40.

FIG. 2 shows the electric circuit of the photomultiplier 17. Voltages V1, V2 and V3 generated at bleeder resistors Rb1, Rb2 and Rb3 (i.e. the first, second and third bleeder resistors as counted in the direction from the plate P side to the cathode K side of the photomultiplier 17) shown in FIG. 2 were measured for the stimulable phosphor sheets 10T for test carrying the radiation energy stored thereon with different X-ray doses. By the measurement, the results as shown in FIG. 3 were obtained.

In the case where the gain of the photomultiplier 17 is adjusted to suit the ordinary X-ray image recording carried out by use of an X-ray dose of 100 mR or less and the radiation image read-out is carried out for the stimulable phosphor sheet 10 on which X-ray image recording was carried out by use of an X-ray dose exceeding 100 mR, when the photomultiplier 17 detects the light 15 emitted by a background image portion upon which radiation impinged directly without passing through the object, the output current of the photomultiplier 17 goes to or approaches the saturated condition and the level of the stored radiation energy at the background image portion, and consequently the level of the residual radiation energy after the image read-out, cannot be detected accurately. However, as shown in FIG. 3, the voltages generated at the bleeder resistors change with sufficient sensitivity in accordance with the X-ray dose even in the region exceeding the ordinary X-ray dose. As the predetermined bleeder resistor from which the voltage signals Sb are to be detected, there should preferably be selected the one exhibiting the largest change in the voltage generated at the bleeder resistor with respect to changes in the amount of light received by the photomultiplier 17, among a plurality of the bleeder resistors.

After being amplified by the amplifier 40, the voltage signals Sb representing the voltages generated at the bleeder resistor are sent to a sampling circuit 41. The sampling circuit 41 also receives a synchronizing signal Ss for dividing the output signals S of the photomultiplier 17 into picture elements. Based on the synchronizing signal Ss, the sampling circuit 41 samples the voltage signals Sb in synchronization with the timing of the division into the picture elements. Specifically, the voltage signals Sb are sampled to correspond to the respective scanning positions of stimulating rays on the stimulable phosphor sheet 10T for test, i.e. to correspond to the respective picture element positions. The sampling circuit 41 sends the thus sampled voltage signals Sb to an operation circuit 43.

Figure 4:
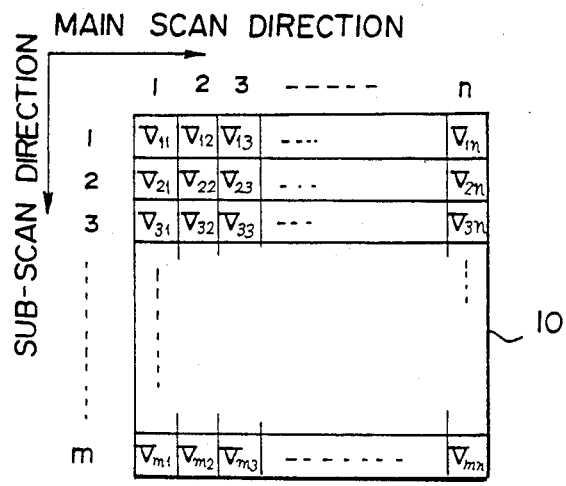
FIG. 4 is an explanatory view showing the relationship between the voltage generated at the bleeder resistor of the photomultiplier and the scanning position of stimulating rays.

The operation circuit 43 calculates average values Vo(1), Vo(2), Vo(3), . . . , Vo(n), where n denotes the number of the picture elements in a main scanning direction, by averaging the bleeder resistor voltage values, which correspond to the respective picture elements and which are represented by the input voltage signals Sb, at common main scanning positions. Specifically, as shown in FIG. 4, a single picture element is denoted by a single cell, and the bleeder resistor voltage values corresponding to the respective picture elements are denoted as $$V_{11}, V_{12}, V_{13} \ldots V_{1n}$$
$$V_{21}, V_{22}, V_{23} \ldots V_{2n}$$
$$V_{31}, V_{32}, V_{33} \ldots V_{3n}$$
$$\vdots$$
$$V_{m1}, V_{m2}, V_{m3} \ldots V_{mn}$$

where m denotes the number of the picture elements in the sub-scanning direction. In this case, by way of example, Vo(1) is calculated by the formula expressed as $$Vo(1) = (V11 + V21 + V31 + \ldots + Vm1)/m$$

Figure 5:
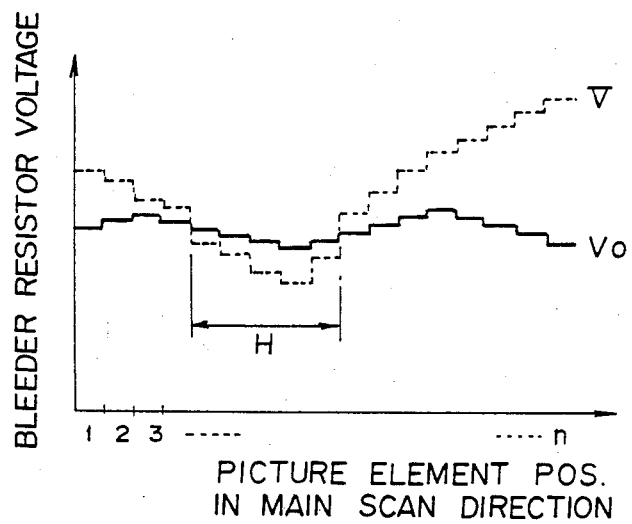
FIG. 5 is a graph showing an example of distribution of the voltages generated at the bleeder resistors.

The bleeder resistor voltage values Vo(1), Vo(2), Vo(3), . . . , Vo(n) at the respective main scanning positions should naturally be equal to one another. However, the long photomultiplier 17 often exhibits shading in the longitudinal direction thereof (main scanning direction), and the bleeder resistor voltage values Vo(1), Vo(2), Vo(3), ..., Vo(n) are not necessarily be equal to one another. An example of the distribution of the bleeder resistor voltage values Vo(1), Vo(2), Vo(3), ..., Vo(n) is indicated by the solid line in FIG. 5. The operation circuit 13 sends the information representing the bleeder resistor voltage values Vo(1), Vo(2), Vo(3), ..., Vo(n) to a memory 44 via a switch 42, and the bleeder resistor voltage values Vo(1) to Vo(n) are stored in the memory 44 to correspond to the respective main scanning positions.

After processing is carried out in the manner as mentioned above, the radiation image read-out is carried out for the stimulable phosphor sheet 10 in the manner as mentioned above. At this time, the voltage signals Sb representing the voltages generated at the predetermined bleeder resistor are detected, and thereafter processing up to the calculation of the average bleeder resistor voltage values at the respective main scanning positions in the operation circuit 43 is carried out in the same manner as mentioned above. An example of the distribution of the bleeder resistor voltage values V(1), V(2), V(3), ..., V(n) calculated at this time is indicated by the broken line in FIG. 5. At the time the radiation image read-out is carried out, the switch 42 is changed over, and the information representing the bleeder resistor voltage values V(1) to V(n) is sent to a comparison circuit 45. The comparison circuit 45 compares the bleeder resistor voltage values V(1) to V(n) with the bleeder resistor voltage values Vo(1) to Vo(n) read from the memory 44 at the respective common main scanning positions. Also, the comparison circuit 45 generates a turn-on instructing signal St when at least one of the values of $V(k)-Vo(k)$, where $k=1, 2, \ldots, n$, is negative (said values are negative in the range as indicated by the arrow H in FIG. 5). The turn-on instructing signal St is sent to a light source turn-on control circuit 46, which activates a second erasing light source 33 at the erasing section 30 upon receiving the turn-on instructing signal St. Therefore, in this case, the stimulable phosphor sheet 10 sent to the erasing section 30 after the radiation image read-out has been finished is exposed to the aforesaid erasing light 32 and the erasing light 34 produced by the second erasing light source 33.

As mentioned above, the bleeder resistor voltage values Vo(1) to Vo(n) are the values obtained at the time the light emitted by the stimulable phosphor sheet 10T for test carrying the predetermined level of the radiation energy stored thereon is detected. Therefore, in the case where the bleeder resistor voltage values V(1) to V(n) smaller than the bleeder resistor voltage values Vo(1) to Vo(n) are detected in the course of the radiation image read-out from the stimulable phosphor sheet 10, it is recognized that the radiation energy of a high level exceeding the predetermined level is stored on the stimulable phosphor sheet 10. In this case, the level of the radiation energy remaining on the stimulable phosphor sheet 10 after read-out processing has been carried out becomes high, and the residual radiation energy cannot be substantially released only with the erasing light 32 produced by the first erasing light source 31. However, with this embodiment wherein the second erasing light source 33 is turned on besides the first erasing light source 31, the high level of the residual radiation energy can be released substantially from the stimulable phosphor sheet 10.

The distribution of the bleeder resistor voltage values Vo(1) to Vo(n) and the distribution of the bleeder resistor voltage values V(1) to V(n) are affected by shading of the photomultiplier 17. However, with the aforesaid embodiment wherein the bleeder resistor voltage values Vo(1) to Vo(n) and the distribution of the bleeder resistor voltage values V(1) to V(n) are compared with each other at the respective main scanning positions, i.e. at the positions where the level of the adverse effects of shading is the same. Accordingly, the level of the radiation energy stored on the stimulable phosphor sheet 10 above the predetermined level can be detected accurately regardless of the characteristics of shading.

The aforesaid embodiment is constituted to detect whether the radiation energy exceeding the predetermined level is stored or not on the stimulable phosphor sheet 10 subjected to the radiation image read-out. However, the differences $V(k)-Vo(k)$ between the bleeder resistor voltage values attain a smaller value (a negative value having a large absolute value) as the level of the radiation energy becomes higher above the predetermined level. Therefore, by measuring the difference values, it is also possible to measure to what extent the level of the stored radiation energy on the stimulable phosphor sheet 10 exceeds the predetermined level, and to control the erasing light irradiation amount continuously or step-wise in accordance with the measured values.

Also, besides the control of the erasing light irradiation amount in accordance with the level of the stored radiation energy exceeding the predetermined level in the manner as mentioned above, the erasing light irradiation amount may be controlled in accordance with the output current value of the photomultiplier 17 as disclosed in Japanese Unexamined Patent Publication No. 60(1985)-260035 in the case where the radiation energy of a level not higher than the predetermined level is stored on the stimulable phosphor sheet 10. Also, since the amount of erasing light irradiated onto the stimulable phosphor sheet 10 is equal to erasing light illuminance×irradiation time, the erasing light irradiation time may be controlled for the control of the erasing light irradiation amount by changing the movement speed of the stimulable phosphor sheet 10 at the erasing section 30.

Also, in the aforesaid embodiment, the erasing light irradiation amount is increased at the time the level of the stored radiation energy exceeding the predetermined level is detected. However, in the case where the level of the stored radiation energy exceeding the predetermined level or exceeding a level higher by a predetermined value than the predetermined level is detected, the erasing light irradiation amount may be not controlled, but instead an alarm may be activated to send the stimulable phosphor sheet 10 passing through the erasing section 30 again to the erasing section 30, or to avoid the reuse of the stimulable phosphor sheet 10 as an erasing error sheet.

Instead of using the long photomultiplier 17 exhibiting the shading, the light emitted by the stimulable phosphor sheet 10 may be guided by a light guide member having a specific shape to a photomultiplier having a comparatively small light receiving face. Such a light guide member may exhibit shading. The method of detecting a level of stored radiation energy on a stimulable phosphor sheet in accordance with the present invention is also suitable in such a case, and can accurately detect the level of the stored radiation energy exceeding the predetermined level regardless of shading of the light guide member.

I claim:

1. A method of detecting a level of stored radiation energy on a stimulable phosphor sheet in radiation image read-out wherein a stimulable phosphor sheet carrying a radiation image stored thereon is scanned by stimulating rays which cause the stimulable phosphor sheet to emit light in proportion to the stored radiation energy, and photoelectrically detecting the light emitted by scanned portion of the stimulable phosphor sheet by use of a photomultiplier, thereby to obtain image signals representing the radiation image, the method of detecting a level of stored radiation energy on a stimulable phosphor sheet comprising the steps of:
(i) storing a predetermined level of radiation energy on a stimulable phosphor sheet for test prior to said radiation image read-out,
(ii) carrying out the scanning by said stimulating rays and the detection of said emitted light for said stimulable phosphor sheet for test, detecting a voltage Vo generated at a bleeder resistor of said photomultiplier at each scanning position of said stimulating rays at this time, and storing said voltage Vo to correspond to said scanning position in a storage means,
(iii) in the course of carrying out said radiation image read-out from said stimulable phosphor sheet carrying said radiation image stored thereon, detecting a voltage V generated at said bleeder resistor of said photomultiplier at each scanning position of said stimulating rays,
(iv) comparing said detected voltage V with said voltage Vo stored in said storage means at each scanning position, and
(v) based on the value of V-Vo, detecting a radiation energy level, that exceeds said predetermined level, on said stimulable phosphor sheet subjected to said radiation image read-out.

2. A method as defined in claim 1 wherein said bleeder resistor is the one exhibiting the largest change in the voltage generated at the bleeder resistor with respect to changes in the amount of light received by said photomultiplier, among a plurality of the bleeder resistors.

3. A method as defined in claim 1 wherein said photomultiplier is a long photomultiplier.

4. A method as defined in claim 1 wherein said stimulating rays are a laser beam.

* * * * *